(12) United States Patent
Faulkner

(10) Patent No.: US 6,964,398 B1
(45) Date of Patent: Nov. 15, 2005

(54) CONTAINER HOLDING DEVICE

(76) Inventor: Stephen M. Faulkner, P.O. Box 492993, Redding, CA (US) 96049

( * ) Notice: Subject to any disclaimer, the term of this patent is extended or adjusted under 35 U.S.C. 154(b) by 0 days.

(21) Appl. No.: 10/610,795

(22) Filed: Jul. 2, 2003

(51) Int. Cl.[7] .............................................. A47B 96/06
(52) U.S. Cl. ............................ 248/213.2; 248/311.2; 248/315; 215/390; 220/735
(58) Field of Search ............................ 248/311.2, 315, 248/312, 312.1, 213.2; 224/926; 220/735, 220/738; 215/390, 392

(56) References Cited

U.S. PATENT DOCUMENTS

| 284,090 A | * | 8/1883 | Tingle .......................... 211/75 |
| 1,077,027 A | * | 10/1913 | Austin ........................ 248/315 |
| 1,227,046 A | * | 5/1917 | Ferguson .................... 248/212 |
| 1,655,799 A | * | 1/1928 | Rickersberg ................ 248/212 |
| 3,269,683 A | | 8/1966 | Shinaver |
| 3,432,136 A | * | 3/1969 | Penney ........................ 248/315 |
| 4,063,701 A | | 12/1977 | Wray |
| 4,256,281 A | | 3/1981 | Harris et al. |
| 4,653,711 A | * | 3/1987 | Marshell .................. 248/205.3 |
| 4,877,164 A | | 10/1989 | Baucom |
| 4,993,611 A | | 2/1991 | Longo |
| 5,028,026 A | * | 7/1991 | Philipps et al. .......... 248/206.2 |
| 5,213,298 A | * | 5/1993 | Johnson ..................... 248/313 |
| 5,356,107 A | | 10/1994 | Sinohuiz |
| 5,566,917 A | * | 10/1996 | Wu .......................... 248/311.2 |
| 5,673,835 A | | 10/1997 | Kalat |
| 5,752,687 A | | 5/1998 | Lynch |
| 5,826,764 A | * | 10/1998 | Beckham .................... 224/274 |
| 5,833,194 A | * | 11/1998 | Jones et al. .............. 248/311.2 |
| 6,010,104 A | * | 1/2000 | Hanson et al. ........... 248/311.2 |
| 6,176,405 B1 | | 1/2001 | Roach |
| D470,727 S | | 2/2003 | Bartley |
| 2002/0179794 A1 | | 12/2002 | Yang |

FOREIGN PATENT DOCUMENTS

JP          2003276494 A  *  9/2003  ............ B60N 3/10
WO      WO 02/070331 A1    9/2002

* cited by examiner

*Primary Examiner*—Korie Chan
(74) *Attorney, Agent, or Firm*—Theodore J. Bielen, Jr.

(57) ABSTRACT

A container holding device for use with a vehicle fuel filler cap used on a fuel tank. The device includes a spacer interposed the fuel filler cap and the fuel tank. A container support is connected to the spacer by an arm which extends outwardly from the fuel filler of the fuel tank.

3 Claims, 2 Drawing Sheets

CONTAINER HOLDING DEVICE

BACKGROUND OF THE INVENTION

The present invention relates to a novel and useful container holding device which is particularly useful with all terrain vehicles, (ATVs).

Operators of motor vehicles are often perplexed when it is desirous to store or temporarily hold beverage containers if the vehicle is in motion. Enclosed vehicles such as automobiles and trucks, often use cup holders which are fastened to the interior of the vehicle in a place determined by the operator of the vehicle. Also, cup holders are commonly molded directly into manufactured consoles provided in a vehicle or constitute a portion of a retractable mechanism which moves into a concealed position and into an available position by the touch of a button and the like.

Certain vehicles, such as ATVs, motorcycles, and the like, being smaller in size, do not possess the amenity of beverage container holders found in larger vehicles. Consequently, there is normally no place for holding a beverage container, requiring the operator of the vehicle to use one hand to support the beverage container while moving. This, of course, presents potentially unsafe condition.

In the past, various structures have been proposed to hold containers such as cups onto items in vehicles which are generally compact in size. For example, U.S. Pat. Nos. 4,256,281 and 4,993,611 describe beverage container supports each of which includes a fastening portion and a holder connected thereto. The fastening portion includes a clamp which may be attached to a base.

United States Patent Application Publication 2002/0179794 and Design Patent D470,727 describe cup holders which include a support that may be engaged to a surface to hold liquids in a cup which is also supported by a encircling member.

U.S. Pat. Nos. 4,063,701 and 5,356,107 teach cup holders or beverage container holders which may be clipped to the vertical structures of chairs.

U.S. Pat. No. 3,269,683 shows a beverage container which is used in conjunction with a golf cart and is connected to the handle thereof.

U.S. Pat. Nos. 5,673,835 and 5,752,687 illustrate cup holders that are attached to portions of vehicles such as bicycles.

U.S. Pat. No. 4,877,164 and PCT Publication WO 02/070331 describe beverage container holders used within vehicles to hold cups and similar articles.

U.S. Pat. No. 6,176,405 reveals a beverage container for a motorcycle which employs a triangular shaped bracket that is attached to the tank of a motorcycle via a securing member that is held in place by Velcro fasteners.

A container holding device for use with a vehicle that is used in conjunction with the fuel tank of a vehicle would be a notable advance in the recreational field.

BRIEF SUMMARY OF THE INVENTION

In accordance with the present invention a novel and useful container holding device is herein provided.

The container holding device of the present invention may be utilized with a vehicle, such as an all terrain vehicle (ATV). In such a vehicle, as well as in other vehicles, the fuel tank is accessible to the driver or operator of the ATV. In addition, the entrance to the fuel tank of the ATV includes a fuel filler cap.

The holding device of the present invention employs a spacer which is interposed a fuel filler cap and the fuel tank. The spacer may be formed into a ring which is generally of a flat configuration to contact the fuel filler cap and the fuel tank when the fuel filler cap is in place on the fuel tank. The container support may also be provided with a gasket or a plurality of gaskets which then lie between the spacer and the fuel tank. In this manner, the spacer is maintained snuggly in position. However, there remains enough play in the sandwich configuration between the filler cap, spacer, and fuel tank to allow the spacer to swivel relative to the fuel tank. The importance of this feature will be discussed hereinafter as the specification continues.

A container support is also utilized in the present invention. Although the support may take many configurations, a ring and platform may be used to hold a beverage container in the upright position for accessibility by the operator of the ATV. In addition, other embodiments of the container support may be employed such as a cylindrical, insulated holder, commonly known as a "cool cup".

An arm extends between the container support and the spacer, being connected to these elements. The arm would normally project toward the user of the vehicle, in the case of an ATV. Since the spacer is capable of swiveling relative to the gas tank, the connected arm would also swivel changing the position of the container support according to the convenience of the operator of the vehicle. The arm may be formed in a straight configuration or be angulated to conform to the contours of the fuel tank.

It may be apparent that a novel and useful container holding device has been described.

It is therefore an object of the present invention to provide a container holding device which is capable of being supported on the fuel tank of a compact vehicle such as an ATV.

Another object of the present invention is to provide a container holding device which utilizes the fuel filler cap as a locking mechanism.

Another object of the present invention is to provide a container holding device which is easily installed and removed on an ATV.

A further object of the present invention is to provide a container holding device which is mountable to a fuel tank of an ATV and is adjustable to position the same relative to the operator.

Yet another object of the present invention is to provide a container holding device which is easily manufactured and repaired.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the prior delineated drawings.

Figure 1:
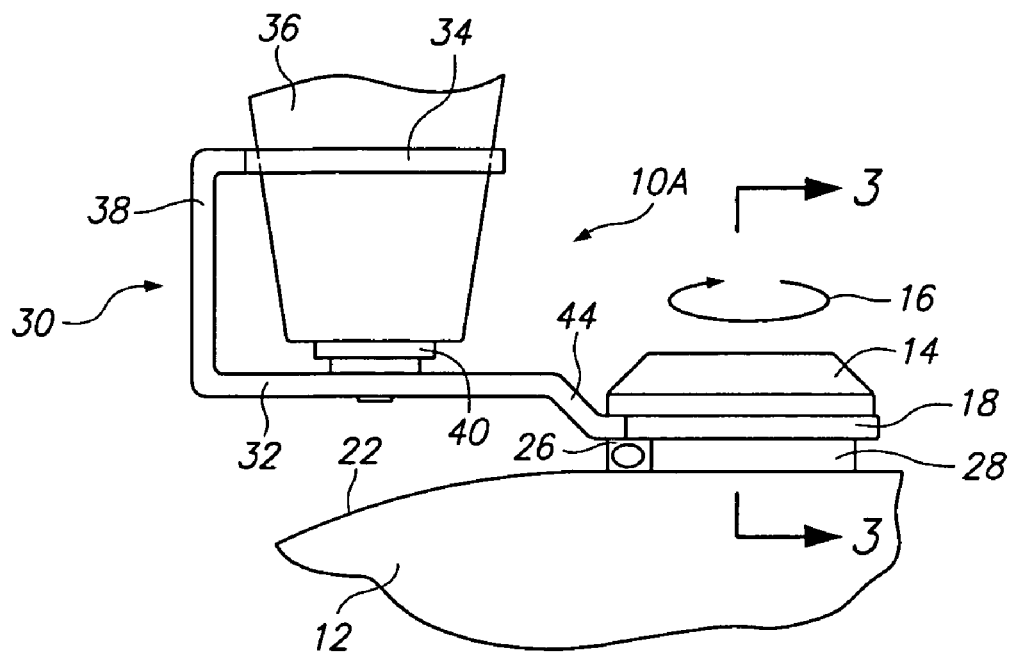
FIG. 1 is a side elevational view of an embodiment of the present invention showing a fuel tank of an ATV in portion.

The preferred embodiments of the present invention are depicted in the drawings by reference character 10 followed by an uppercase letter to denote variations. With reference to FIG. 1, a container holding device 10A is depicted. Device 10A is used in conjunction with a vehicle fuel tank 12 having a fuel filler cap 14, normally employed to enclose the fuel within tank 12. Fuel filler cap 14 generally rotates according to directional arrow 16, FIG. 1. As depicted in FIGS. 1–4, fuel tank 12 is of conventional construction normally found on an all terrain vehicle (ATV).

Device 10A includes as one of its elements a spacer 18. Spacer 18 is generally formed into a ring configuration and may include an angulated perimeter 20. Spacer 18 and many of the remaining portions of device 10 may be, fashioned of flat aluminum stock, although the invention is not restricted to this material. In any case, spacer 18 is sized to fit top the upper surface of fuel tank 12 and to surround, at least partially, the opening 24 to tank 12, best shown in FIG. 3. Tubular gaskets 26 and 28 serve to cushion and seal the space between spacer 18 and surface 22 of fuel tank 12. Tubular gaskets 26 may be formed of elastomeric material such as neoprene rubber, polymeric plastic, and the like.

Another element of device 10 comprises a container support 30, FIG. 1. Container support 30 possesses a base portion 32 and a ring 34 that surrounds beverage container 36, which may be a glass, can, cup, and the like. Bracket 38 bridges base 32 and ring support 34 in the embodiment depicted in FIG. 1. A pedestal 40 is fixed to base 32 by fastener 42 and is visible on FIG. 2, since container 36 has been omitted for the sake of clarity.

Device 10A also utilizes an arm 44 which connects container support 30 to spacer 18. Arm 44 may be angulated as shown on FIG. 1 to place container 36 in a convenient position for the user of the same or to conform to the contours of surface 22 of vehicle fuel tank 12. In any case, arm 44 of device 10A positions base 32 upwardly to a greater degree than spacer 18 in the embodiment depicted in FIG. 1.

Figure 2:
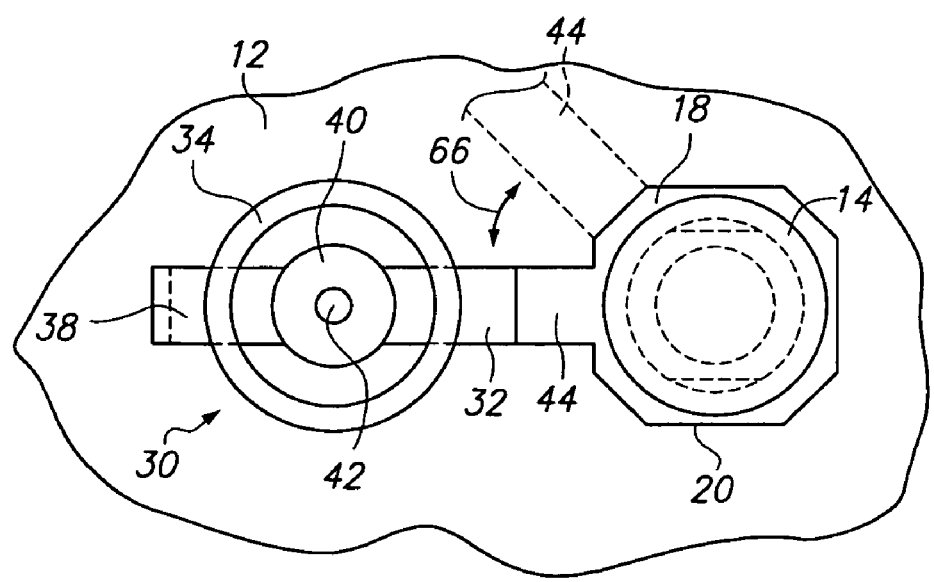
FIG. 2 is a top plan view corresponding to the embodiment of FIG. 1 and indicating the swiveling action of the spacer relative to the fuel tank in phantom.
Figure 3:
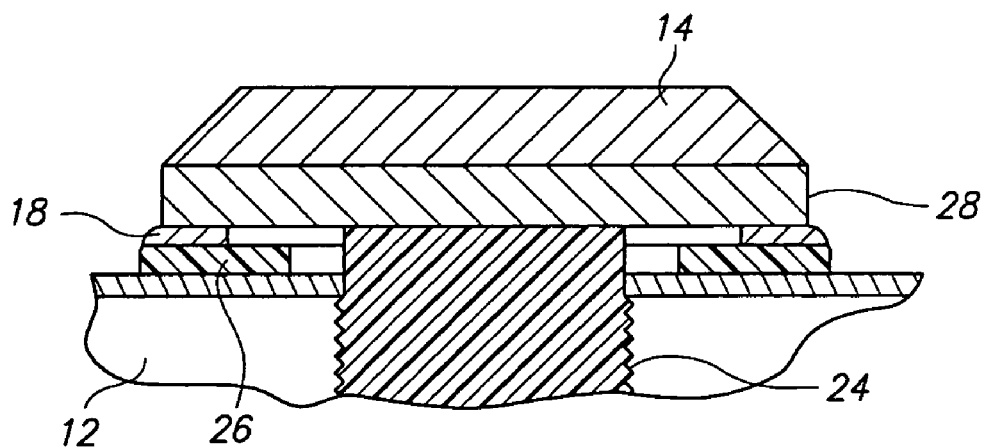
FIG. 3 is a sectional view taken along line 3—3 of FIG. 1.
Figure 4:
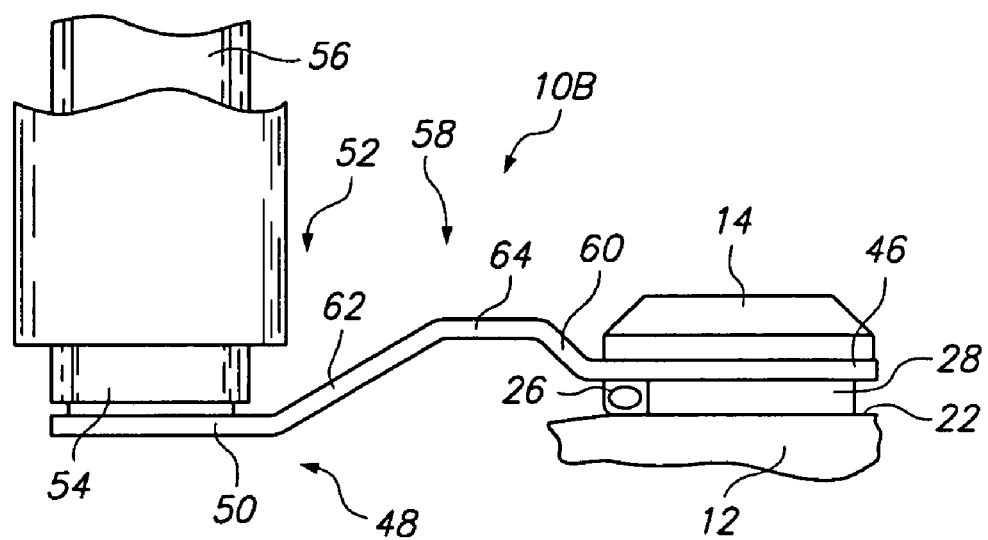
FIG. 4 is a side elevational view showing another embodiment of the present invention.

Turning to FIG. 4, it may be observed that device 10B is depicted in which a spacer 46 is depicted and is positioned similarly to spacer 18 of embodiment 10A. That is to say, spacer 46 is sandwiched between fuel filler cap 14 and the upper surface 22 of vehicle fuel tank 12. Gaskets 26 and 28 may also be employed with spacer 46. Container support 48 includes base 50 having a vessel 52 held thereto by boss 54. Vessel, 52 may be insulated to hold container 56, which is shown in the form of an aluminum can containing a beverage. Arm 58 is angulated having a first portion 60 a second portion 62 and an intermediate portion 64 connecting portion 60 and 62. Thus, base 50 of device 10B is angulated downwardly and lies at a lower level relative to surface 22 of fuel tank 12 than spacer 46. With reference to FIGS. 2 and 4, it may be noted that spacers 18 and 46 may rotate relative to filler cap 14 when filler cap is screwed into position as depicted in FIG. 3. Such rotational movement is shown in phantom in FIG. 2 and the motion of rotation is indicated by directional arrow 66.

In operation, the user employs device 10A or 10B with the fuel tank 12 of an ATV by removing fuel cap 14 from the fuel tank 12. Spacer 18 or 46 is then placed about opening 24 to fuel tank 12. Fuel filler cap 14 is then screwed into place as shown in FIG. 3 squeezing gaskets 26 and 28 downwardly. However, spacers 18 and 46 may rotate as desired to position devices 10A or 10B, relative to the operator of the vehicle, for the sake of convenience. Container holders 30 or 48, or any other conventional container holder may be employed to allow the operator of the vehicle to imbibe beverages from such containers while the vehicle is at rest or moving.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A container holding device for use with a vehicle fuel filler cap employed to enclose the entrance to a fuel tank, comprising:
   a. a spacer, said spacer adapted to interpose the fuel filler cap and the fuel tank;
   b. a container support;
   c. an arm, said arm including a first portion connected to said spacer, a second portion connected to said support, and a third portion connected to said first and second portions, said third portion being angulated relative to said first and second portions;
   d. a pedestal positioned on said second portion of said arm below the container support and intended to contact the container; and
   e. a gasket adapted to interpose said spacer and the vehicle fuel tank.

2. The device of claim 1 in which said container support includes a ring.

3. The device of claim 1 in which said container support includes a vessel.

* * * * *